(12) United States Patent
Schneider et al.

(10) Patent No.: US 7,534,383 B2
(45) Date of Patent: May 19, 2009

(54) METHOD OF SUPPORTING A BUSHING AGAINST RADIAL MOVEMENT RELATIVE TO A STEERING COLUMN JACKET WITH A FILLER MATERIAL

(75) Inventors: Douglas M. Schneider, Saginaw, MI (US); Terry E. Burkhard, Bay City, MI (US); Kurt J. Hilbrandt, Hemlock, MI (US); Christopher L. Walsh, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 782 days.

(21) Appl. No.: 11/007,544

(22) Filed: Dec. 8, 2004

(65) Prior Publication Data

US 2006/0117898 A1 Jun. 8, 2006

(51) Int. Cl.
*B29C 45/14* (2006.01)
(52) U.S. Cl. ............... 264/262; 264/269; 264/267
(58) Field of Classification Search ............... None
See application file for complete search history.

(56) References Cited

U.S. PATENT DOCUMENTS

| | | | | |
|---|---|---|---|---|
| 3,590,655 A | * | 7/1971 | Farrell et al. | 74/492 |
| 3,670,591 A | * | 6/1972 | Milton | 74/492 |
| 3,703,105 A | * | 11/1972 | Milton et al. | 74/492 |
| 3,714,841 A | * | 2/1973 | Grosseau | 74/492 |
| 4,636,106 A | * | 1/1987 | Waisbrod | 403/228 |
| 5,086,661 A | * | 2/1992 | Hancock | 74/493 |
| 5,114,521 A | * | 5/1992 | Isegawa et al. | 156/242 |
| 5,243,874 A | * | 9/1993 | Wolfe et al. | 74/493 |
| 5,348,345 A | * | 9/1994 | Dykema et al. | 280/777 |
| 5,383,811 A | * | 1/1995 | Campbell et al. | 464/89 |
| 5,590,565 A | * | 1/1997 | Palfenier et al. | 74/493 |
| 5,640,884 A | * | 6/1997 | Fujiu et al. | 74/492 |
| 5,722,300 A | * | 3/1998 | Burkhard et al. | 74/493 |
| 2005/0200111 A1 | * | 9/2005 | Cymbal et al. | 280/775 |
| 2005/0262960 A1 | * | 12/2005 | Cymbal et al. | 074/492 |

* cited by examiner

*Primary Examiner*—Edmund H. Lee
(74) *Attorney, Agent, or Firm*—Thomas N. Twomey

(57) ABSTRACT

The invention provides an apparatus including a steering column jacket defining an interior. The invention also provides a bushing disposed in the interior of the steering column jacket. The bushing includes a radially outwardly facing bearing surface and a first channel. The first channel is radially adjacent to the bearing surface. The first channel is accessible from the interior of the steering column jacket. The invention also provides injected filler material disposed in the first channel between the bushing and the steering column jacket. The filler material supports the bearing surface against radial movement relative to the steering column jacket.

9 Claims, 3 Drawing Sheets

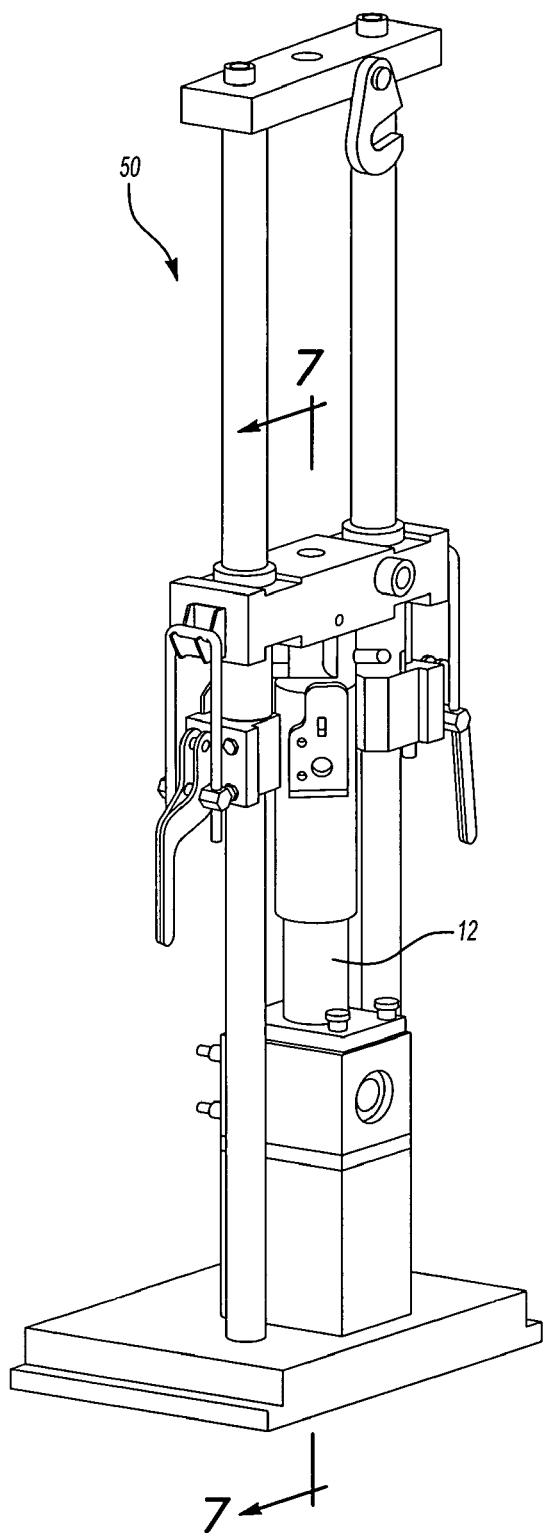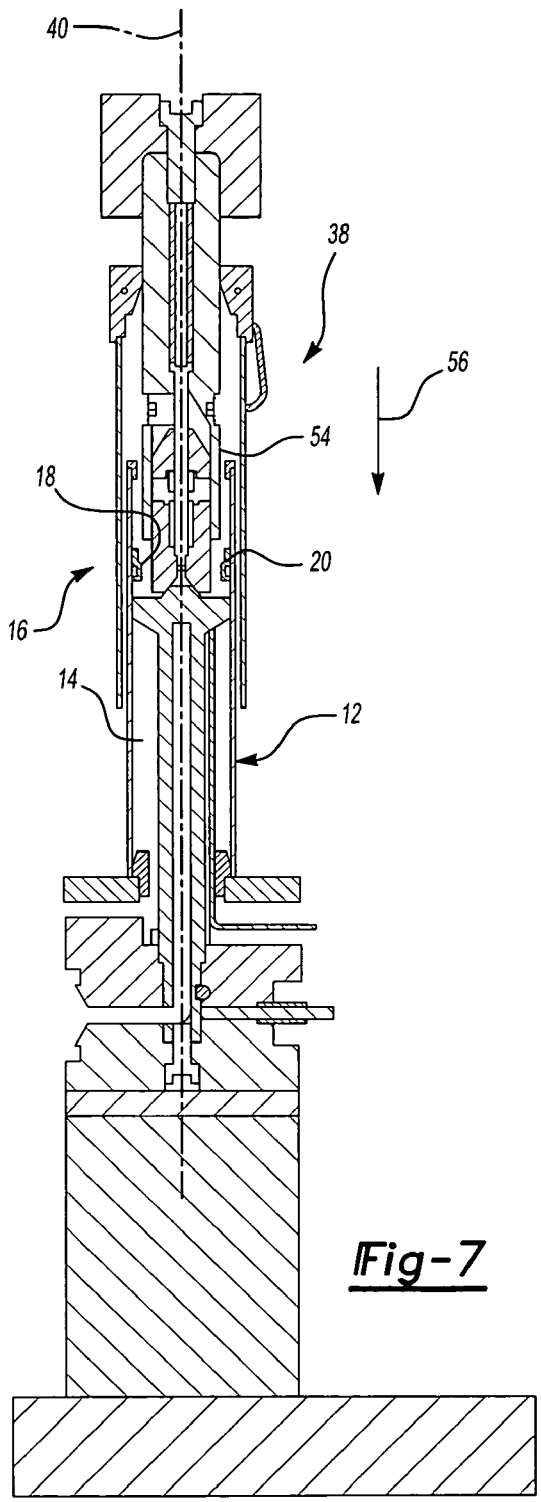

METHOD OF SUPPORTING A BUSHING AGAINST RADIAL MOVEMENT RELATIVE TO A STEERING COLUMN JACKET WITH A FILLER MATERIAL

FIELD OF THE INVENTION

The invention relates to a steering column of a vehicle and more particularly to a bushing disposable between two steering column members telescopically engaged with one another.

BACKGROUND OF THE INVENTION

Telescoping steering columns include first and second members that slide relative to one another. It is desirable to position a bearing surface between the first and second members to enhance sliding movement between the first and second members. In some telescoping steering columns, a third member encircles both the first and second members and a bushing defining a bearing surface is positioned in between first and second members. An aperture is formed in the third member and the outer of the first and second members. The aperture communicates with a channel defined by the bushing adjacent the bearing surface. Plastic is injected through the aperture and into the channel. The plastic hardens and supports the bearing surface.

SUMMARY OF THE INVENTION AND ADVANTAGES

The invention provides an apparatus including a steering column jacket defining an interior. The invention also provides a bushing disposed in the interior of the steering column jacket. The bushing includes a radially outwardly facing bearing surface and a first channel. The first channel is radially adjacent to the bearing surface. The first channel is accessible from the interior of the steering column jacket. The invention also provides injected filler material disposed in the first channel between the bushing and the steering column jacket. The filler material supports the bearing surface against radial movement relative to the steering column jacket.

The invention is an advantageous improvement over the prior art. One advantage is that the processing operation of forming the aperture is eliminated. Also, the invention provides a supported bearing surface in steering columns having an energy absorbing structure disposed between the third member and the outer of the first and second members.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a perspective view of an injection machine according to the exemplary embodiment of the invention;

FIG. 7 is a cross-sectional view taken along section lines 7-7 in FIG. 6;

DETAILED DESCRIPTION OF THE PREFERRED EMBODIMENT

Figure 1:
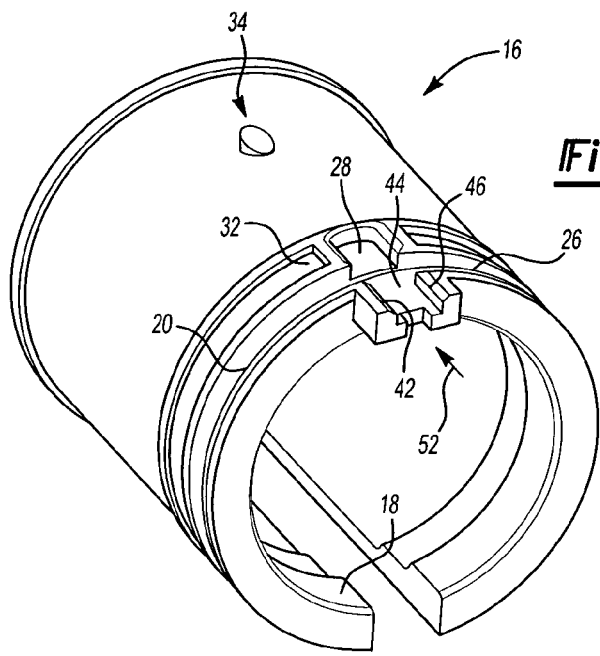
FIG. 1 is a perspective view of a bushing according to the exemplary embodiment of the invention.
Figure 2:
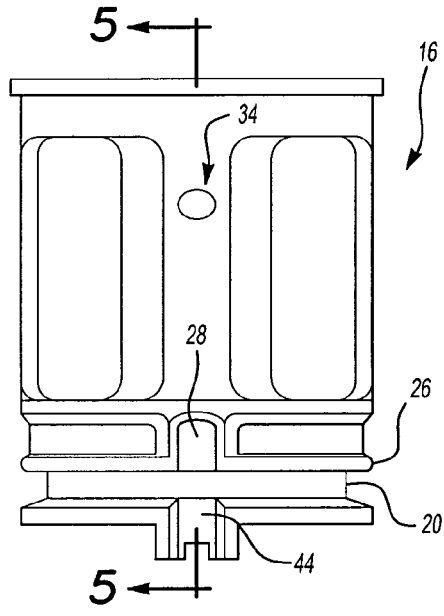
FIG. 2 is a front view of the bushing shown in FIG. 1.
Figure 3:
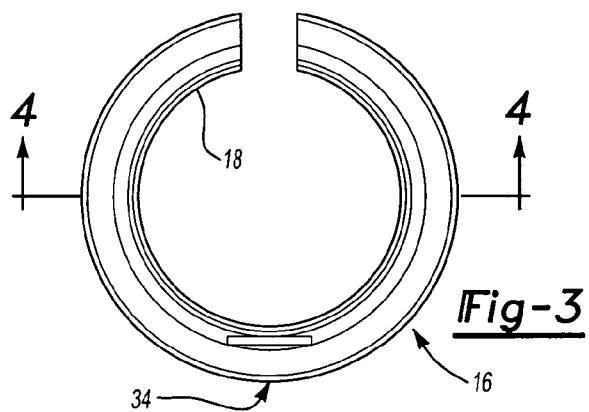
FIG. 3 is a top view of the bushing shown in FIGS. 1 and 2.
Figure 4:
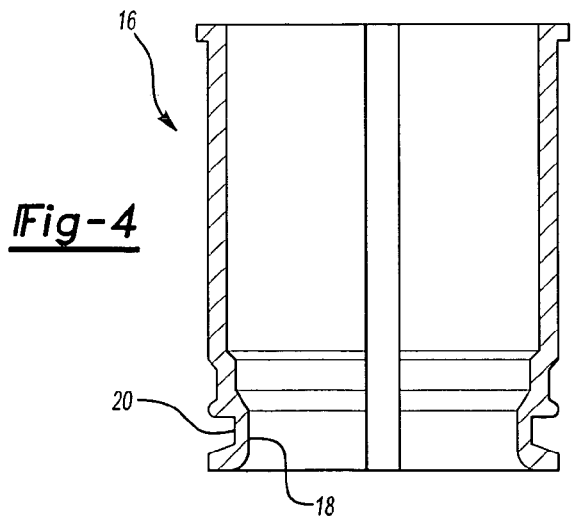
FIG. 4 is a cross-sectional view taken along section lines 4-4 in FIG. 3.
Figure 5:
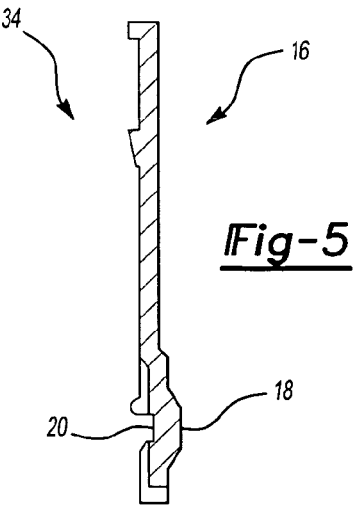
FIG. 5 is a partial cross-sectional view taken along section lines 5-5 in FIG. 2.
Figure 8:
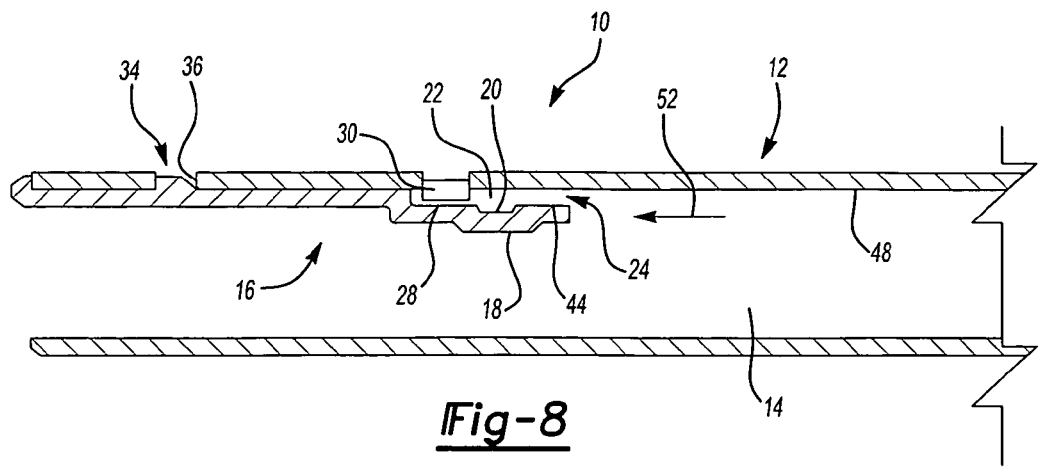
FIG. 8 is a cross-sectional view taken along a longitudinal axis of a steering column jacket after filler material has been injected to a first channel of the bushing.
Figure 9:
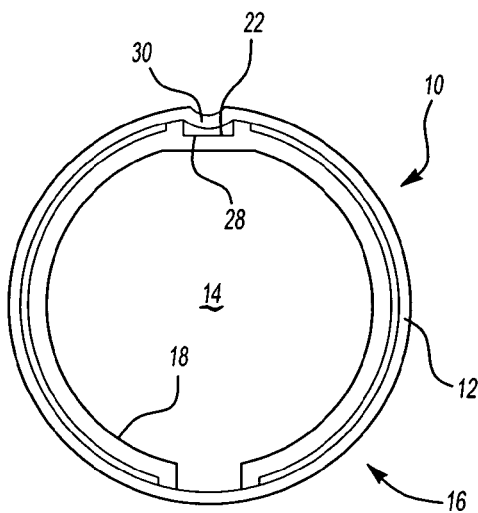
FIG. 9 is a cross-sectional view taken along a plane transverse to the longitudinal axis after filler material has been injected to a first channel of the bushing.
Figure 10:
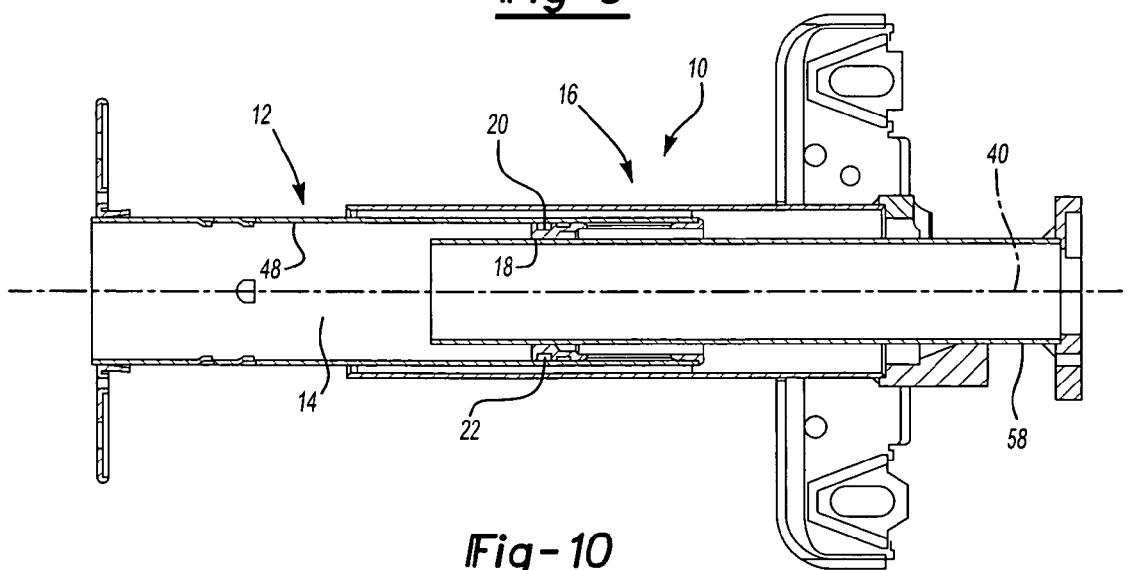
FIG. 10 is s a cross-sectional view taken along the longitudinal axis of the steering column jacket after filler material has been injected to a first channel of the bushing and after other steering column components have been assembled with respect to the steering column jacket.

Referring now to FIGS. 8 and 10, an apparatus 10 includes a steering column jacket 12 defining an interior 14. A bushing 16 is disposed in the interior 14 of the steering column jacket 12 and includes a radially outwardly facing bearing surface 18 and a first channel 20. The first channel 20 is radially adjacent to, and longitudinally aligned with, the bearing surface 18. The first channel 20 is accessible from the interior 14 of the steering column jacket 12. The apparatus also includes injected filler material 22 disposed in the first channel 20 between the bushing 16 and the steering column jacket 12. The filler material supports the bearing surface 18 against radial movement relative to the steering column jacket 12. The bearing surface 18 is concentric with the first channel 20.

The steering column jacket 12 can be a lower jacket or an upper jacket. The steering column jacket 12 can be an inner jacket or an outer jacket. The steering column jacket 12 can be a relatively stationary jacket or a relatively movable jacket.

In the exemplary embodiment of the invention, an opening 24 is defined between the bushing 16 and the steering column jacket 12. The opening 24 fluidly communicates with the first channel 20. The bushing 16 defines surfaces 42, 44, 46 that cooperate with an interior surface 48 of the steering column jacket 12 to form the opening 24. An injector of an injecting device 50 (shown in FIG. 6) can engaged the opening 24 and injected the filler material 22 into the first channel 20 through the opening 24.

The steering column jacket 12 of the exemplary embodiment is continuous adjacent the opening 24 and the first channel 20. The first channel 20 defines a radially outwardly facing opening 26 and the steering column jacket 12 completely encloses the radially outwardly facing opening 24. In other words, the steering column jacket 12 is without apertures adjacent the first channel. The filler material 22 is moved to the first channel from the interior 14 of the steering column jacket 12 rather than moved through an aperture formed through the surface 48 of the steering column jacket 12.

The bushing 16 defines a pocket 28 communicating with the first channel 20 and the steering column jacket 12 includes a radially inwardly extending projection 30 disposed in the pocket 28. In operation of the exemplary embodiment, the bushing 16 is slidbaly received in the interior 14 of the steering column jacket 12. Sliding movement of the bushing 16 can end when the projection 30 is received in the pocket 28. A portion of the injecting device 50 enters the interior 14 and injects the filler material 22 in the liquid form through the opening 24 to the first channel 20. The pocket 28 of the exemplary embodiment is aligned with the opening 24. The liquid filler material 22 at least partially surrounds or envelopes the projection 30, filling the pocket 28. The filler material 22 is cooled or cured or solidified and prevents the radially inwardly extending projection 30 from moving with respect to the pocket 28.

The exemplary bushing 16 includes a secondary channel 32 axially spaced from and in communication with the first channel 20. Filler material 22 moves in opposite directions in the first channel from the opening 24. When either stream of liquid filler material 22 reaches an end of the first channel 20, the liquid filler material 22 moves into the secondary channel 32. The secondary channel 32 may or may not be filled with liquid filler material 22 during the injection process. In one embodiment of the invention, an amount of filler material 22 needed to slightly overfill the first channel 20 and pocket 28 is known and a slightly greater amount of filler material 22 is injected such that a quantity of liquid filler material 22 enters the secondary channel 32. The first channel 20 is deeper than the secondary channel 32 in the exemplary embodiment of the invention.

The bushing 16 includes a radially outwardly extending projection 34 axially spaced from the first channel 20. The lower steering column jacket 12 includes a slot 36 receiving the radially outwardly extending projection 34. During insertion of the bushing 16 with respect to the steering column jacket 12, the projection 34 and slot 36 cooperate to maintain the position of the bushing 16 and the steering column jacket 12 with respect to one another prior to the injection process. The projection 34 is chamfered toward the first channel 20 to enhance sliding movement of the bushing 16 relative to the steering column jacket 12.

The interior 14 encloses the first channel 20 and cooperates with the bushing 16 to define the opening 24 so that the first channel 20 is accessible from the interior 14 of the steering column jacket 1. The opening 24 extends from the interior 14 along a path 52 less than ninety degrees relative to a longitudinal axis 40 of the steering column jacket 12. In the exemplary embodiment of the invention the path 52 extends parallel to a longitudinal axis 40 of the steering column jacket 12.

In an exemplary process for practicing the invention, the bushing 16 is disposed between a mandrel 38 and the steering column jacket 12. The mandrel 38 is radially adjustable. Referring now to FIG. 7, a sleeve member 54 moves in a direction 56 to engage the bearing surface 18 prior to injection of the filler material 22. The sleeve member 54 can be replaced with any of a plurality of differently sized sleeve members to adjust the position of the bearing surface 18 as desired. For example, the clearance between the bushing 16 and a second steering column member 58 can be adjusted by sleeve member 54. The filler material 22 may shrink during cooling and the diameter of the sleeve member 54 can be selected in view of the shrinkage of the plastic and desired clearance between the bearing surface 18 and the second steering column member 58.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of supporting a bushing against radial movement relative to a steering column jacket with a filler material, the bushing including a radially outwardly facing bearing surface and a first channel radially adjacent to the bearing surface, said method comprising the steps of:

defining an interior of the steering column jacket;

disposing the bushing in the interior of the steering column jacket such that the bushing is accessible from the interior of the steering column jacket; and injecting the filler material into the first channel between the bushing and the steering column jacket from within the interior of the steering column jacket to radially support the bushing relative to the steering column jacket.

2. The method of claim 1 including the step of: enclosing the first channel with the steering column jacket.

3. The method of claim 1 wherein said step of injecting the filler material into the first channel is further defined as directing liquid plastic into the first channel along a path extending less than ninety degrees relative to a longitudinal axis of the steering column jacket.

4. The method of claim 3 wherein said directing step is further defined as: directing liquid plastic to the first channel along a path extending parallel to the longitudinal axis of the steering column jacket.

5. The method of claim 1 including the step of: disposing the bushing between a mandrel and the steering column jacket.

6. The method claim 5 wherein said disposing step is further defined as: disposing the bushing between a radially adjustable mandrel and the steering column jacket.

7. The method of claim 6 including the step of: selecting one of a plurality of diameters of the radially adjustable mandrel before said disposing step.

8. The method of claim 1 wherein said inserting step includes the step of: moving the bushing along a longitudinal axis of the lower steering column jacket until a radially inwardly extending projection of the steering column jacket is received in a pocket defined by the bushing and communicating with the first channel.

9. The method of claim 8 wherein said injecting step further comprises: injecting the plastic into the pocket to fixedly associate the radially inwardly extending projection with the bushing.

* * * * *